(12) United States Patent
Wälchli et al.

(10) Patent No.: US 12,154,771 B2
(45) Date of Patent: Nov. 26, 2024

(54) CHAMBER FOR AN IONIZATION VACUUM GAUGE

(71) Applicant: INFICON AG, Balzers (LI)

(72) Inventors: Urs Wälchli, Chur (CH); Stefan Kaiser, Ruggell (LI); Bernhard Andreaus, Rapperswil (CH); Martin Wüest, Malans (CH); Astrid Waldner, Bad Ragaz (CH); Michael Trefzer, Ruggell (LI)

(73) Assignee: INFICON AG, Balzers (LI)

( * ) Notice: Subject to any disclaimer, the term of this patent is extended or adjusted under 35 U.S.C. 154(b) by 0 days.

(21) Appl. No.: 18/431,091

(22) Filed: Feb. 2, 2024

(65) Prior Publication Data
US 2024/0194465 A1 Jun. 13, 2024

Related U.S. Application Data

(63) Continuation of application No. PCT/EP2023/071914, filed on Aug. 8, 2023.

(30) Foreign Application Priority Data

Aug. 8, 2022 (CH) .............................. 000935/2022

(51) Int. Cl.
*H01J 41/10* (2006.01)
*G01L 21/30* (2006.01)
*H01J 41/02* (2006.01)

(52) U.S. Cl.
CPC .............. *H01J 41/10* (2013.01); *G01L 21/30* (2013.01); *H01J 41/02* (2013.01)

(58) Field of Classification Search
CPC .............................. H01J 41/10; G01L 21/30
See application file for complete search history.

(56) References Cited

U.S. PATENT DOCUMENTS

| 3,446,958 A | 5/1969 | Cambou et al. |
| 2010/0066380 A1* | 3/2010 | Knapp .................... G01L 21/32 250/281 |
| 2019/0043702 A1* | 2/2019 | Wüest .................... H01J 41/06 |
| 2022/0334016 A1* | 10/2022 | Strietzel .................. G01L 21/32 |

OTHER PUBLICATIONS

EP 4033216 Machine Translation, 2022-07-207 (Year: 2022).*
WO 2021052599 Machine Translation, Mar. 25, 2021 (Year: 2021).*
International Search Report and Written Opinion received in corresponding International Application No. PCT/EP2023/071914, mailed Nov. 20, 2023, in 8 pages.

* cited by examiner

*Primary Examiner* — Raul J Rios Russo
(74) *Attorney, Agent, or Firm* — Procopio, Cory, Hargreaves & Savitch LLP

(57) ABSTRACT

Chamber (11, 12, 13) for bounding a plasma generation area (42) in a vacuum pressure sensor (40), wherein the chamber comprises an electrically conductive casing element (1, 1', 1") located radially on the outside relative to a central axis, wherein the chamber comprises electrically conductive wall elements (2, 2', 2") arranged substantially perpendicular to the central axis and connected to the casing element, wherein at least one of the wall elements has a first opening (3), through which the central axis extends, wherein the casing element comprises at least a first (B1) and a second region (B2), wherein the first region is located closer to the central axis than the second region. The invention further relates to a vacuum pressure sensor comprising the chamber.

10 Claims, 7 Drawing Sheets

CHAMBER FOR AN IONIZATION VACUUM GAUGE

This application is a Continuation of International Application No: PCT/EP2023/071914, filed Aug. 8, 2023, which claims the benefit of CH 000935/2022, filed Aug. 8, 2022, the contents of which are incorporated herein by reference.

The present invention relates to the technical field of vacuum pressure sensors. In particular, the invention relates to a chamber for a vacuum pressure sensor in the form of an ionization vacuum gauge, and to a vacuum pressure sensor comprising the chamber according to the invention.

Vacuum pressure sensors or vacuum gauges, by which pressures significantly below normal pressure can be determined, are known. Among the known vacuum pressure sensors, so-called ionization vacuum gauges have a particularly broad measurement range. In an ionization vacuum gauge, a residual gas is ionized and a plasma is generated. The electrons required to ionize the gas are generated either by a hot cathode (hot cathode ionization vacuum gauge) or in a self-sustaining gas discharge between cold electrodes (cold cathode vacuum gauge). For example, the current from an anode to a cathode is measured as a parameter for determining the pressure. The anode and the cathode are in contact with the generated plasma. By suitably combining electric and magnetic fields, the trajectory of the electrons within the vacuum pressure sensor can be extended, and thus the ion yield can be increased. The generated plasma emits radiation, which can be analysed in addition to the measured current and can be used to determine the pressure or also to determine the composition of a residual gas. By way of example, document WO 2021/052599 A1 discloses a method for determining a pressure in a vacuum system, and a vacuum pressure sensor which is designed to evaluate radiation emitted by the plasma.

In such a vacuum pressure sensor, the electromagnetic radiation to be analysed is passed through a window or lens, which is permeable at least in a range of the electromagnetic spectrum, onto a detector which is arranged separately from the zone in which a plasma is generated. Due to the plasma and possibly due to a plasma-related sputtering effect on the cathode, it may happen that the plasma side of the window or lens becomes increasingly less permeable to the radiation over longer operating times, for example due to a thin metal layer accumulating on the window or lens.

The object of the present invention was to provide a component for an alternative device for generating a plasma in a vacuum pressure sensor. In particular, it was an object of the invention to provide a device which minimizes the aforementioned side-effects of generating a plasma in a vacuum pressure sensor.

This object is achieved according to the invention by a chamber.

The chamber according to the invention is designed to bound a plasma generation area in a vacuum pressure sensor. The chamber comprises an electrically conductive casing element located radially on the outside relative to a central axis. The chamber further comprises electrically conductive wall elements arranged substantially perpendicular to the central axis and connected to the casing element. At least one of the wall elements has a first opening, through which the central axis extends. The casing element comprises at least a first and a second region, wherein the first region is located closer to the central axis than the second region.

Due to the opening in the wall element, the chamber is suitable for receiving an anode rod of an ionization vacuum gauge along the central axis of the chamber. The chamber can perform the role of a cathode.

Because the first and the second region of the casing element are at different distances from the axis, the casing element is not circular-cylindrical. By way of example, the first and the second region may be located at different axial positions, or they may be located at different positions in the azimuthal direction relative to the axis. When a voltage is applied between a central anode and the casing element, a higher electric field is generated between the central axis and the first region of the casing element than between the second region of the casing element and the central anode. As the inventors have recognized, this difference can be advantageous for the service life of an optical element arranged in physical proximity to the chamber.

The casing element may be formed in one piece, or it may be constructed from multiple parts.

The wall elements may comprise, for example, ferromagnetic material. Ferromagnetic wall elements may, for example, interact with an arrangement of permanent magnets of an ionization vacuum gauge, which are arranged outside the chamber, to influence the magnetic field pattern in the interior of the chamber.

Exemplary embodiments of the chamber according to the invention will become apparent from the exemplary embodiments.

In one embodiment, a cross-section through the casing element has the shape of a polygon in a plane perpendicular to the central axis.

The polygon may be, for example, a hexagon or a dodecagon. Such a polygonal cross-section fits well into a substantially cylindrical environment but ensures that there are regions located at a smaller and larger distance from the central axis. Thus, the distance between the central axis and the casing element varies dependent on the azimuthal direction.

In one embodiment, the casing element is conical at least in part.

The casing element may have, for example, the shape of the lateral surface of a truncated cone. In this case, the above-mentioned first region, which is located closer to the central axis, is located at the end of the truncated cone that has the smaller radius.

In one embodiment, the first region of the casing element is located in the middle of the chamber relative to the axial direction of the central axis.

For example, the casing element may be formed of two parts, wherein each part has the shape of the lateral surface of a truncated cone and the sides that have the smaller radius but against each other in the middle of the chamber or are fastened to a middle wall element.

In one embodiment, the chamber comprises three mutually parallel wall elements, wherein all three wall elements have a central opening, through which the central axis extends.

This embodiment is suitable for receiving an anode rod of an ionization vacuum gauge, which projects through all wall elements.

In one embodiment, at least one of the wall elements has a second opening.

A second or even further openings may serve for better fluid-dynamic connection to a space in which a pressure is to be measured. A second or even further openings may also provide multiple continuous radiation paths for electromagnetic radiation generated in a plasma. The second or further openings are openings positioned and a radial offset from the central axis.

In a further embodiment, said first opening is surrounded by an inner rim of the at least one wall element. The inner rim has at least a first section protruding towards the central axis. The inner rim has a second section being more distant from the central axis than the first section.

The inventors have recognized that such a variation of distance between the inner rim of a wall element and the central axis, which will result in a variation of the distance between the inner rim of the wall element and the anode, when the chamber is used for bounding a plasma generation area in a vacuum pressure sensor, helps to ignite a plasma under unfavourable conditions, such as a pressure at the lower operating range of the vacuum pressure sensor.

Such an ignition aid may be achieved, for example, by one or several small spikes protruding inward from a circular inner rim, by a contour of the inner rim smoothly varying in azimuthal direction. Sections where the distance to the central axis is larger block less radiation, in case that radiation emitted from the plasma is to be analysed. This embodiment is particularly useful in a vacuum pressure gauge, which has a spectrometer attached to it. Alternatively, or in combination with the above, a surface of the inner rim may be oriented oblique with respect to the central axis, such that the section protruding towards the central axis is on a different axial position than the section being more distant from the central axis. As an example, a tapering rim around the first opening may be formed by drilling said opening by means of a conical drill. This way, a relatively sharp edge around the first opening may be produced. In embodiments having wall a wall element comprising ferromagnetic material, a variation of the distance between the inner rim of the first opening does not only lead to a shaping of the electrical field, but in addition, helps to concentrate a magnetic field in certain regions along the central axis or in certain azimuthal positions.

The invention also relates to a vacuum pressure sensor. The vacuum pressure sensor according to the invention comprises the chamber according to the invention. The vacuum pressure sensor further comprises an anode arranged along the central axis of the chamber and means arranged radially outside the chamber for generating a magnetic field in the interior of the chamber.

The chamber is suitable for serving as a cathode or part of the cathode of a vacuum pressure sensor in the form of an ionization vacuum gauge. More specifically, the vacuum pressure sensor described above is an ionization vacuum gauge of the inverted-magnetron type.

In an alternative to the inverted-magnetron type, the invention further relates to a vacuum pressure sensor.

This vacuum pressure sensor according to the invention comprises the chamber according to the invention having the role of an anode. The vacuum pressure sensor further comprises a cathode at least partly arranged along the central axis of the chamber and means arranged radially outside the chamber for generating a magnetic field in the interior of the chamber.

The chamber is suitable for serving as anode or part of the anode of a vacuum pressure sensor in the form of an ionization vacuum gauge. With the roles of the anode and the cathode being interchanged with respect to the previously described vacuum pressure sensor of the inverted-magnetron type, this alternative vacuum pressure sensor is an ionization vacuum gauge of the magnetron type.

Embodiments of the vacuum pressure sensor will become evident from the exemplary aspects.

An embodiment of the vacuum pressure sensor further comprises a housing. The housing has a flange surrounding an aperture for establishing fluid connection between the plasma generation area inside the vacuum pressure sensor and a measuring space outside the vacuum pressure sensor. A radiation-permeable element is arranged in a wall of the housing in such a way that electromagnetic radiation emitted from the plasma generation area can reach an outside of the housing through said radiation-permeable element. The chamber according to invention is located inside the housing. The first region of the casing element of the chamber is located on a first side of the chamber, which first side is oriented towards the flange. The second region of the casing element of the chamber is located on a second side of the chamber, which second side is oriented towards said radiation-permeable element.

In a specific realization of this embodiment, the electrically conductive casing element of the chamber has a frusto-conical shape tapering towards said flange.

Surprisingly, a relatively slight tapering corresponding to an angle of about 3° between the central axis and a surface line on the conical casing element, leads to increased output of radiation emitted from the plasma in low pressure environment. This is surprising, as with this configuration the plasma generating area is expected to be positioned farther from the radiation-permeable element, which at first sight may be expected to result in lower radiation intensity received on the outside of the housing.

In a further embodiment of the vacuum pressure sensor, an optical element, such as e.g. a lens or a mirror, and a spectrometer are arranged on an outer side of said housing. The radiation-permeable element and the optical element cooperate to collect and focus electromagnetic radiation emitted from a region around the anode to an optically sensitive element of the spectrometer.

This type of vacuum pressure sensor profits from an increase in service time as well from an increase in radiation intensity that arrives on the optically sensitive element of the spectrometer.

In a specific variant of the embodiment the optical element is adaptable to compensate for an axial displacement of the radiation emitting region. This variant may specifically combined with the above-discussed embodiment, wherein electrically conductive casing element of the chamber has a frusto-conical shape tapering towards said flange. In this embodiment, the center and the axial extension of the plasma region with highest emission of radiation may vary dependent on the pressure. An adaptable optical element, e.g. a lens moveable in direction of the central axis, helps to adjust the focus point of the whole configuration formed by the spectrometer, the optical element and the radiation-permeable element in the wall of the housing. A control loop may be used to continuously adjust the position of the optical element for maximum radiation intensity received in the spectrometer. In particular, the radiation-permeable element may itself be shaped in form of a lens.

BRIEF DESCRIPTION OF THE DRAWINGS

Exemplary embodiments of the present invention will be explained in greater detail below with reference to figures, in which:

FIGS. 1a-1c shows, in sub-FIGS. 1.a) to 1.c), different views of a first embodiment of the chamber;

FIGS. 2a-2d shows, in sub-FIGS. 2.a) to 2.d), different views of a second embodiment of the chamber;

FIGS. 3a-3d shows, in sub-FIGS. 3.a) to 3.d), different views of a third embodiment of the chamber;

FIG. 1.c) shows a plan view of the wall element 2. Apart from the centrally arranged first opening 3, the wall element has a total of six further openings 4 on a larger radius. Located between the outwardly projecting protrusions on the outer circumference of the wall element are fastening regions 5, at which the wall elements are connected to the casing element, for example by spot welding.

FIG. 2.c) shows a plan view of the same, second embodiment 12.

FIG. 2.d) shows a side view of the same, second embodiment 12. By way of example, the half opening angle of the truncated cone may be 3°, as shown in this side view. By way of example, a length L of the chamber may be in the range from 20 mm to 30 mm. This embodiment of the chamber also has three wall elements 2, 2', 2".

FIG. 3.c) shows a plan view of the same, third embodiment 13.

FIG. 3.d) showed a side view of the same, third embodiment 13. The two truncated cones, each having a half opening angle of the cone of 3°, can clearly be seen in this view.

FIG. 4 shows a longitudinal section, extending along a central axis A, through a vacuum pressure sensor 40 in the form of an ionization vacuum gauge having an anode 41 and a chamber according to the invention as a cathode. The chamber has wall elements 2, 2', 2". The shape and position of the casing element 1 is schematically indicated here by an area outlined in dashed line as a placeholder. Various geometries for the casing element 1 are conceivable here, namely any one of the casing elements of the above-described embodiments 11, 12 and 13 of the chamber is a possible option here. With any of these embodiments of the chamber, the chamber is a kind of push-in chamber, which can be pushed into the illustrated position of the chamber from the flange side 45 of the vacuum pressure sensor. Located radially outside the chamber is a permanent magnet arrangement 44, which serves as a means for generating a magnetic field within the chamber. The permanent magnet arrangement extends annularly around the axis. According to one possible embodiment, this permanent magnet arrangement advantageously interacts with wall elements made of ferromagnetic material. During operation of the vacuum pressure sensor, i.e. when a high voltage is applied between the anode and the cathode and when there is a pressure in the chamber that is within the measurement range of the pressure sensor, a plasma is generated in the plasma generation area 42 around the anode. The plasma emits electromagnetic radiation 43, which can reach the outside through a radiation-permeable element 46, for example a window or a lens, as illustrated by corresponding arrows.

FIG. 5 shows a longitudinal section through an embodiment of a vacuum pressure sensor, partly more generalised than the embodiment shown in FIG. 4, partly with specific details. The vacuum pressure sensor 50 shown here has a housing 51, which has a flange 45, to be connected to a measuring space. At its opposite end, a radiation-permeable element 46, which in this case is formed as a lens, allows that electromagnetic radiation emitted from a radiation emitting region 55, is transmitted to the outside of the housing. The radiation path may lead for example across an optional optical element 53 into a spectrometer 54. The radiation emitting region 55, indicative radiation paths, an optical element 53 in form of a lens and a symbolically indicated spectrometer 54 are shown in dashed lines to indicate that these features are not part of the vacuum pressure sensor 50, but are useful to understand its functioning and furthermore show a specific embodiment. The chamber located inside the housing has a casing element 1, of frusto-conial shape tapering towards the flange 45. This way, the first region B1, which lies closer to the central axis than the second region B2, is on the side closer to the flange, whereas the second region B2 is closer to the side of the radiation-permeable element 46. An anode rod 41 is arranged on the common central axis of the housing and the chamber. Electrical contacts denoted "+" and "−" indicate the way the vacuum pressure sensor is operated. The variant shown here has a central anode rod 41, in electrically conductive connection with the "+" contact, such that vacuum pressure gauge of the inverted-magnetron results. As discussed above, with switched roles of anode and cathode, i.e. mainly by interchanging "+" and "−", a magnetron type gauge may be implemented with only small modifications to the pressures sensor as displayed in FIG. 5. Housing 51 and the inserted chamber together form the cathode of the sensor. Radially outside of the housing, means 52 for generating a magnetic field in the interior of the housing are arranged. The chamber has three wall elements denoted by 2, 2' and 2", each of which has an opening across which the central axis extends. The optical element 53 may optionally be moveable in axial direction, as indicated by a double-sided arrow, in order to adjust a focal point, in case the radiation emitting region 55 shifts along the anode, or if it extends or shrinks in its axial extension, depending on the pressure.

Figure 6:
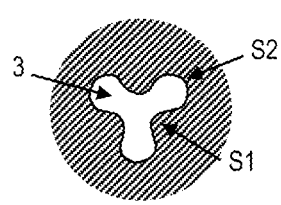
FIGS. 6a-6d shows, in sub-FIGS. 6.a) to 6.c) cross-sectional views in axial directions of variants of first openings, and in sub-FIG. 6.d) a longitudinal section through a variant of a first opening
Figure 6:
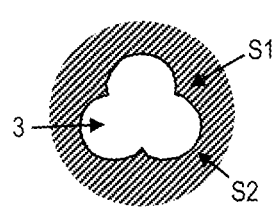
Figure 6:
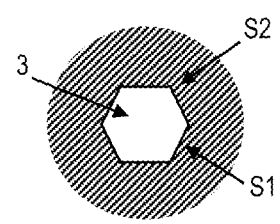
Figure 6:
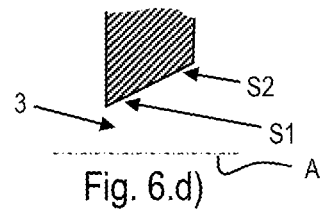

FIG. 6 shows variants of shapes of first openings in the center of a wall element. Only a small fraction of the respective wall element is shown. All the variants shown here have in common that the first opening 3 is surrounded by an inner rim of the wall element, wherein the inner rim has at least a first section S1 protruding towards the central axis A (not marked in FIGS. 6.*a*.) to 6.*c*)) and a second section S2 being more distant from said central axis than the first section. Multiple protruding sections S1 are possible, e.g. three first sections S1 are present in FIGS. 6.*a*) and 6.*b*), and six first sections S1 are present in FIG. 6.*c*). FIG. 6.*d*) shows a protruding region S1 formed by a conical surface of the inner rim. All variants shown here may act as ignition aid, i.e. to help that a plasma can be ignited and maintained at relatively low pressures relative to the measuring range of the vacuum pressure gauge. The protruding sections may be formed as sharp spikes, as in FIGS. 6.*b*) and 6.*d*), or they may be formed with large radii (FIG. 6.*a*) or even be flat, in cases, where a corresponding recess of section S2 is formed in their neighbourhood (FIG. 6.*d*).

Figure 7:
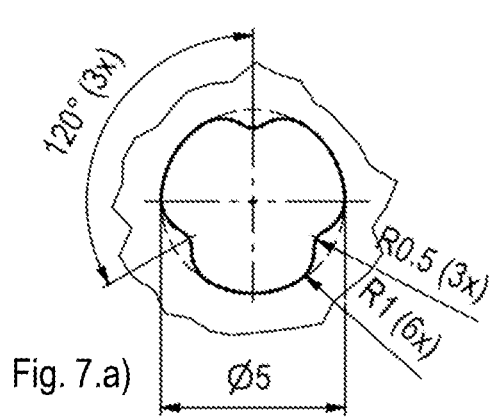
FIGS. 7a-7e shows, in sub-FIGS. 7.a) to 7.e) variants of contours of first openings with specific dimensions.
Figure 7:
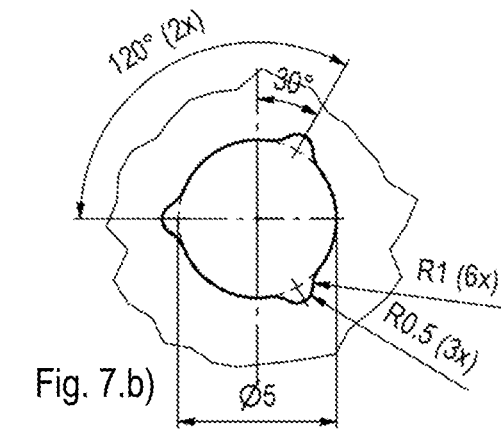
Figure 7:
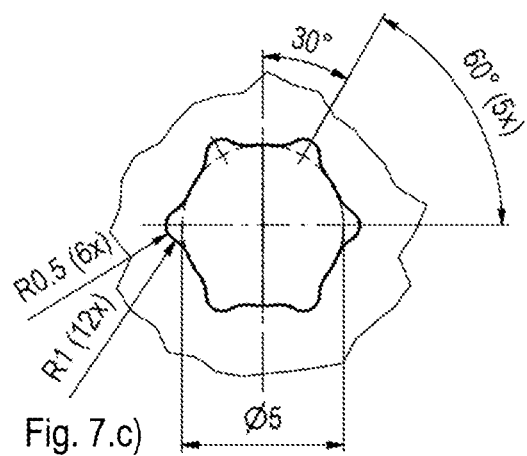
Figure 7:
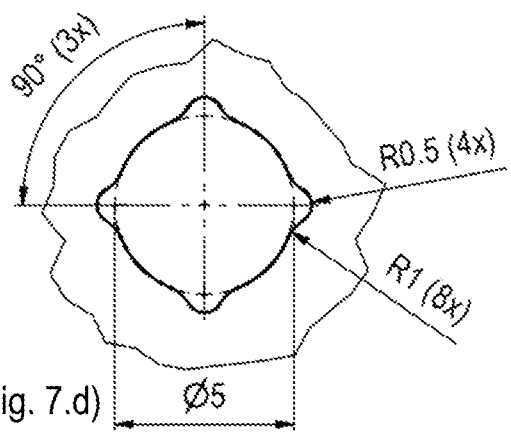
Figure 7:
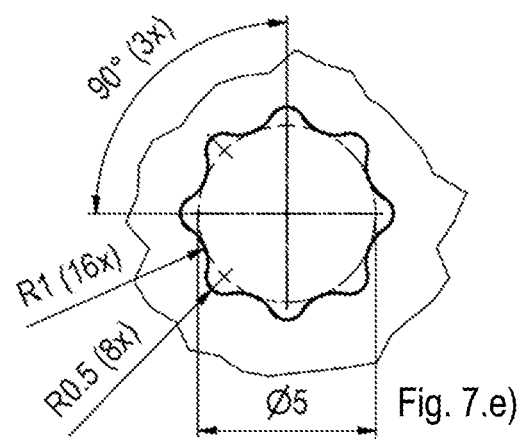

FIG. 7.*a*) to 7.*e*) show variants of the contour of a first opening in a wall-element, all variants being based on an approximate diameter of 5 mm for the opening. Protruding (S1) and recessed (S2) sections repeat three times (FIGS. 7.*a* and 7.*b*), six times (FIG. 7.*c*), four times (FIG. 7.*d*) or eight times (FIG. 7.*e*) along the circumference of the opening, respectively. The protruding sections may be confined to a small fraction of the circumference (FIG. 7.*a*) or cover a large fraction of the circumference (FIG. 7.*b*, 7.*c*, 7.*d*) being separated by more confined recesses in between.

Figure 1:
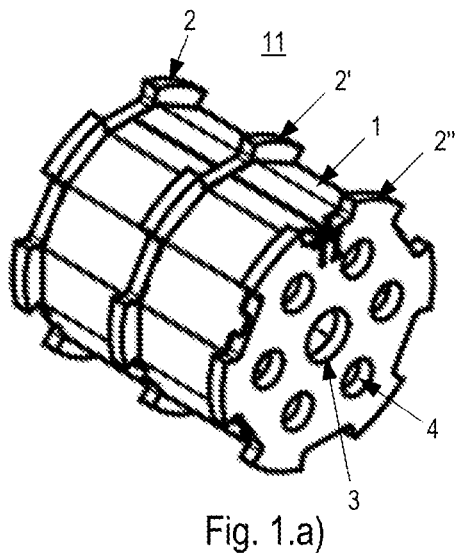
FIGS. 1.a) and 1.b) show two perspective views, from two viewing directions, of a first embodiment 11 of the chamber. In this embodiment, the chamber has a casing element 1 in the shape of the lateral surface of a prism that has a dodecagonal base. Three wall elements 2, 2', 2" respectively form a closure at both ends of the chamber (2, 2") and a middle wall 2'. Six protrusions on the outer circumference of the middle wall 2' project through rectangular-shaped slots in the casing element to beyond the outer surface of the latter. A first opening 3 is located centrally in the wall 2", so that a central axis A of the chamber extends through this opening. Not visible here are central openings in the two walls 2 and 2', through which the central axis likewise extends, so that a central anode rod of an ionization vacuum gauge can be passed through all three central openings.
Figure 1:
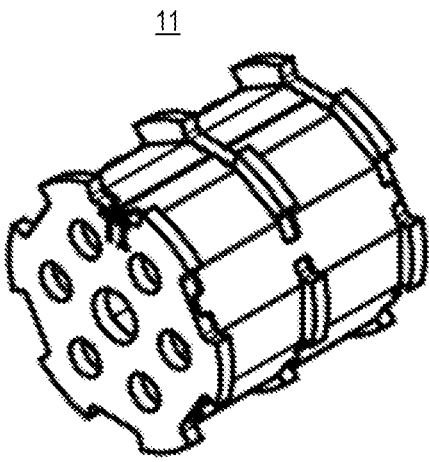
Figure 1:
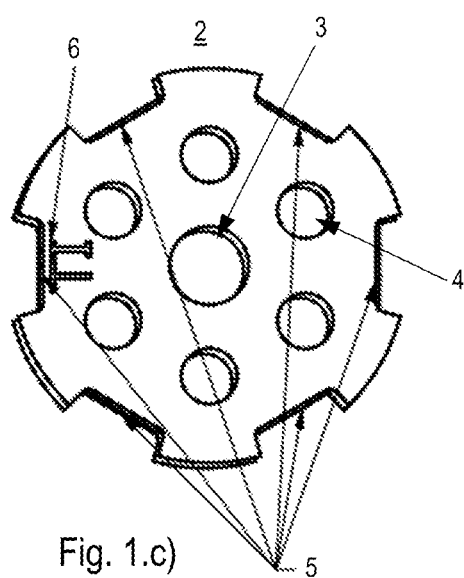
Figure 2:
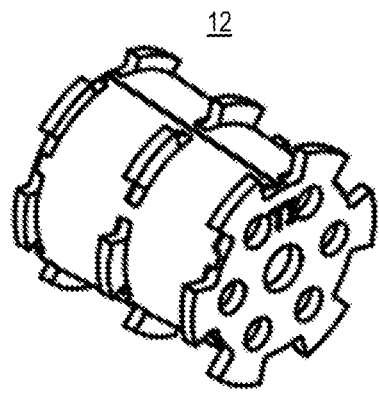
FIGS. 2.a) and 2.b) show two perspective views, from two viewing directions, of a second embodiment 12 of the chamber. In this embodiment, the casing element 1 has the shape of a truncated cone.
Figure 2:
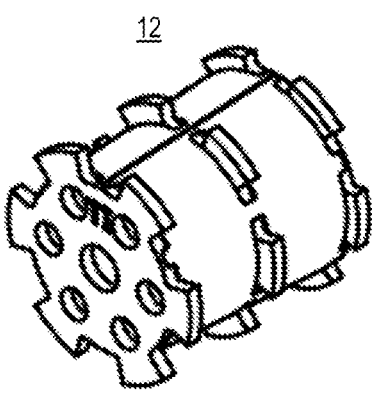
Figure 2:
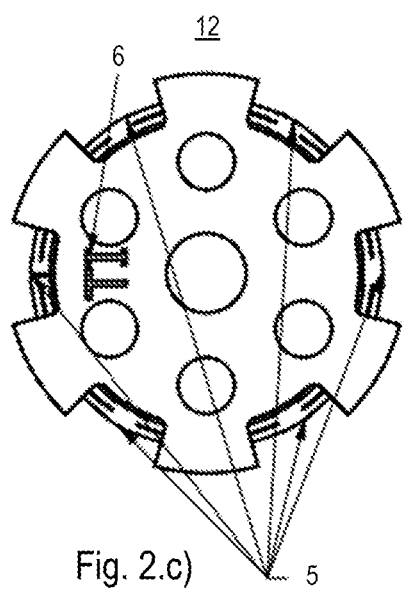
Figure 2:
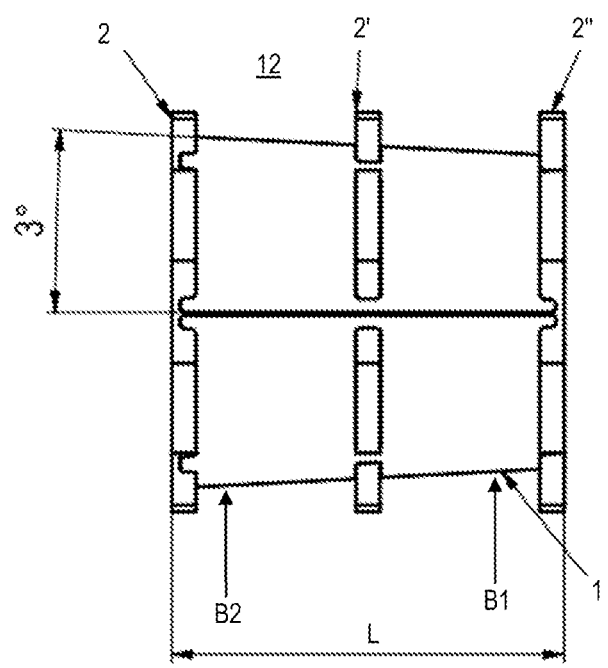
Figure 3:
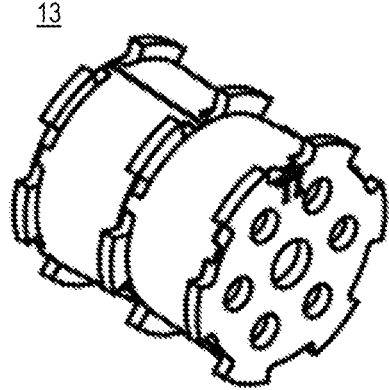
FIGS. 3.a) and 3.b) show two perspective views, from two viewing directions, of a third embodiment 13 of the chamber. In this embodiment, the casing element is formed of two parts, wherein each part 1' and 1" of the casing element has the shape of a lateral surface of a truncated cone, and wherein in each case the side of the truncated cone that has the smaller radius is fastened to the middle wall element 2'. In this way, the first region of the casing element, which is the region located radially closer to the central axis, comes to lie in the middle of the chamber.
Figure 3:
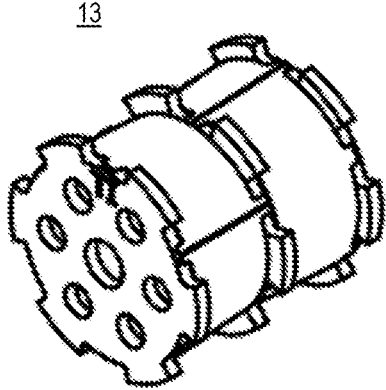
Figure 3:
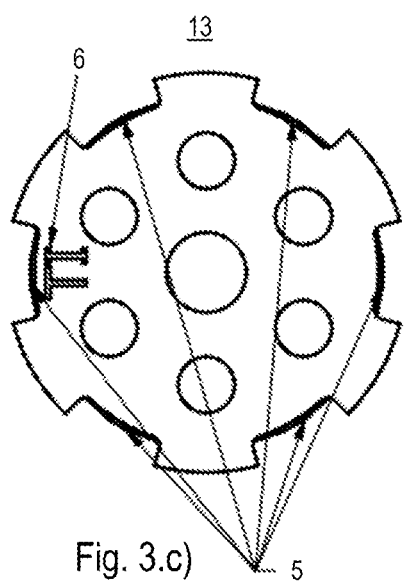
Figure 3:
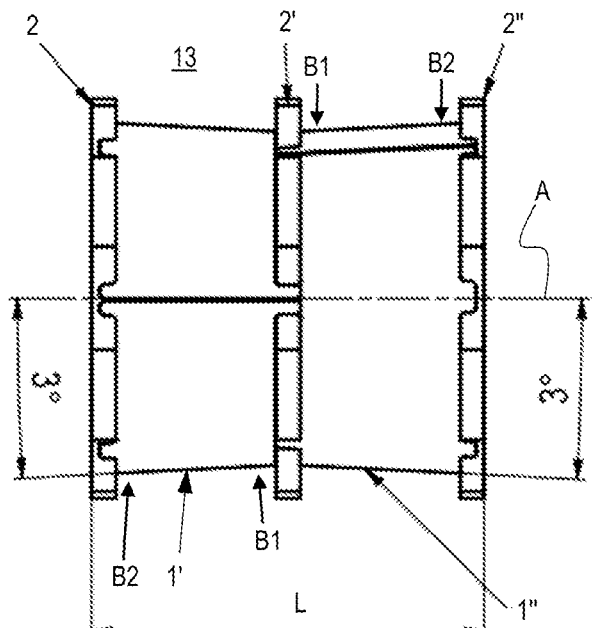
Figure 4:
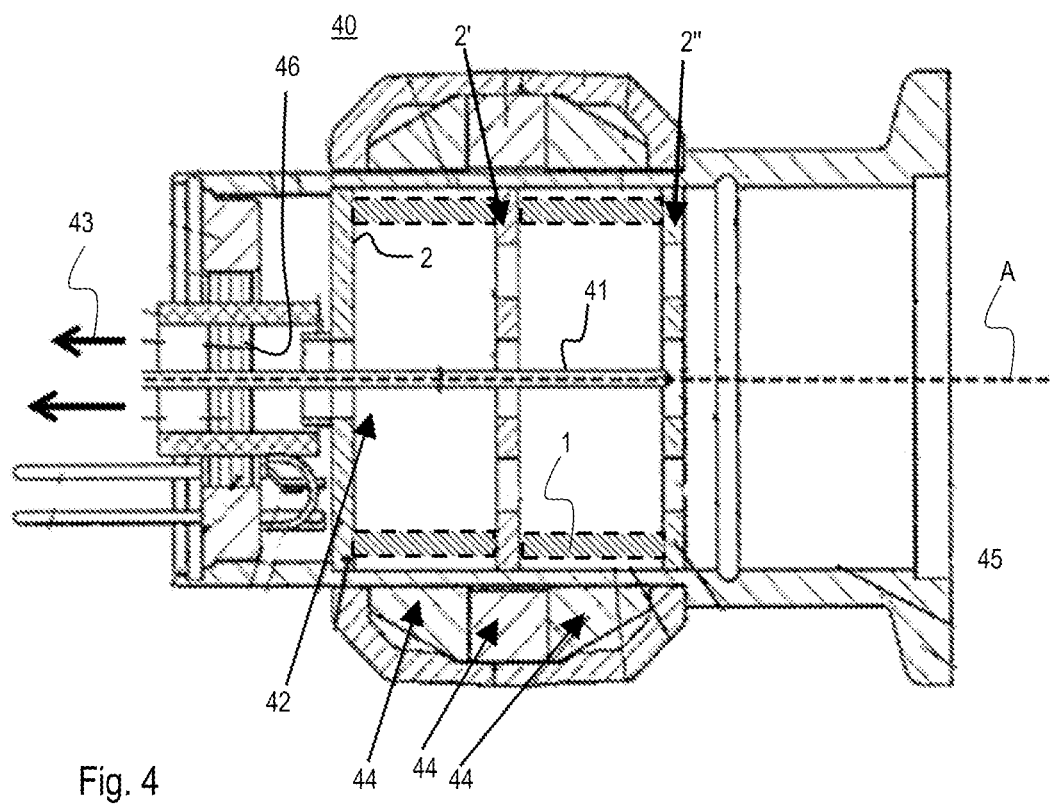
FIG. 4 shows a longitudinal section through a vacuum pressure sensor with a schematically illustrated chamber.
Figure 5:
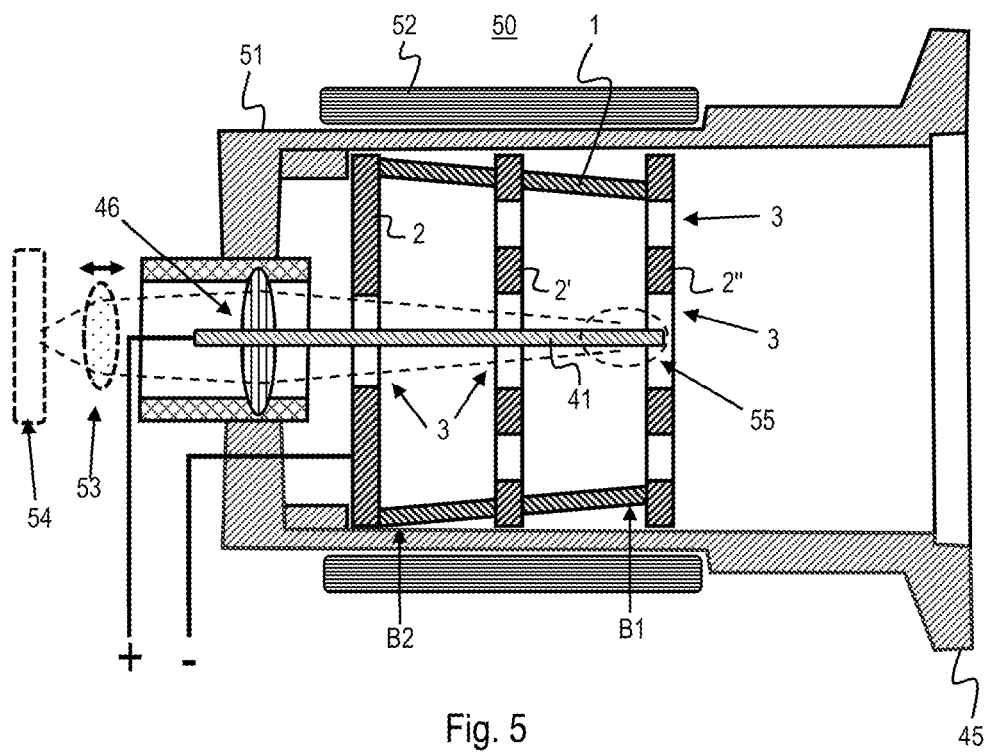
FIG. 5 shows a longitudinal section through an embodiment of a vacuum pressure sensor.
Figure 8:
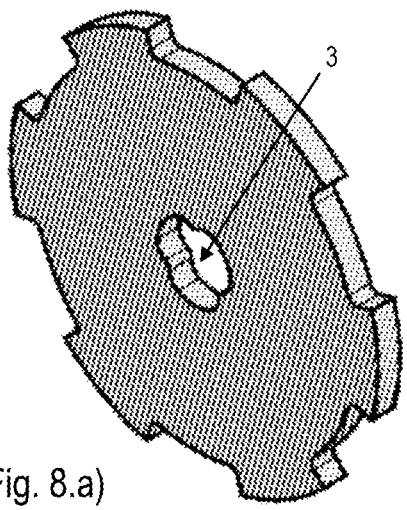
FIGS. 8a-8d shows, in sub-FIGS. 8.a) to 8.d) in perspective view wall-elements with variants of first openings.
Figure 8:
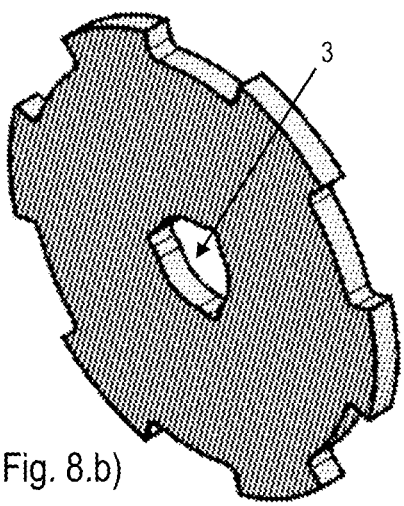
Figure 8:
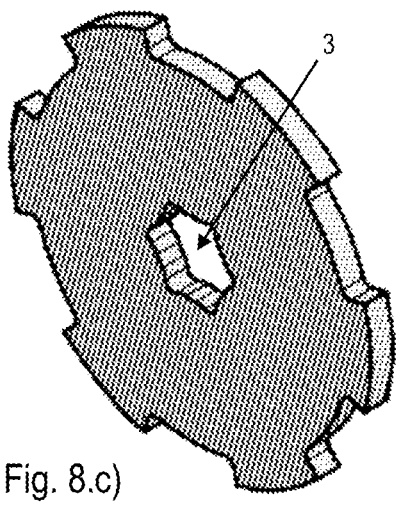
Figure 8:
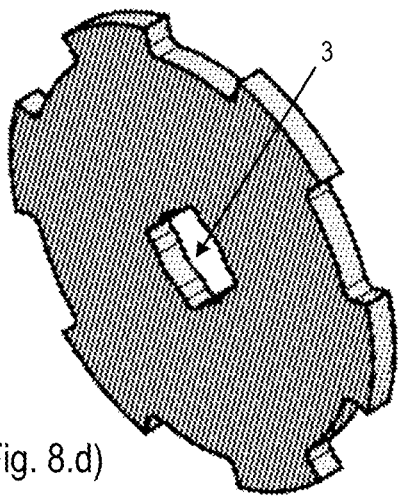

FIG. 8.*a*) to 8.*d*) show a perspective view on a complete wall-element, which could have the role of one of the wall-elements 2, 2' or 2" in one of the above-figures, and with a first opening 3 with a contour as shown in the corresponding sub-figure of FIG. 7. I.e., the contour of the first opening in FIG. 8.*a*) has the geometry displayed in FIG. 7.*a*), as an example. The thickness of the wall-elements shown in FIG. 8 may be approximately 1.5 mm to match the dimensioning as indicated in the corresponding sub-figure of FIG. 7. These wall-elements may e.g. be made of ferromagnetic material. In addition to the first opening 3 shown here, the wall-elements may be further modified to have additional openings at other radial positions, as e.g. shown in FIG. 1.*c*). The form of the first openings of all wall-elements shown in FIG. 8 may be used as ignition aid, such that a plasma is ignited at relatively low pressures.

Returning to the technical effect of all embodiments of the invention, the inventors have recognized that the invention also makes it possible to achieve a field strength variation in a geometric manner, instead of setting a voltage between the electrodes to an appropriate value. Instead, it is now possible to seek a suitable spatial position. By way of example, in an embodiment with a polygonal cross-section along a circle around the anode, the position with the maximum light can be sought and used for optical evaluation. If process conditions vary, this geometric position can be tracked.

Embodiments of the conical and conical-polygonal type make it possible to vary the plasma density along the axis. This has the advantage that it is possible to locate the luminous volume and to combine this with finding the sputtering minimum, i.e., a long service life of the radiation-permeable elements is possible.

LIST OF REFERENCE SIGNS 1 casing element
1', 1" parts of a multi-part casing element
2, 2', 2" wall element
3 first opening (in wall element)
4 second/further opening (in wall element)
5 fastening regions on wall element
6 marking on wall element
11, 12, 13 embodiments of the chamber
40 vacuum pressure sensor
41 anode, e.g. anode rod
42 plasma generation area
43 radiation
44 permanent magnet arrangement
45 flange
46 radiation-permeable element
50 vacuum pressure sensor
51 housing
52 means for generating a magnetic field
53 optical element
54 spectrometer
55 radiation emitting region
A central axis
B1 first region (closer to central axis)
B2 second region (more distant to central axis)
L length (of the chamber)
S1 first section of inner rim of wall element
S2 second section of inner rim of wall element

The invention claimed is:

1. A chamber (11, 12, 13) for bounding a plasma generation area (42) in a vacuum pressure sensor (40), wherein the chamber comprises:
an electrically conductive casing element (1, 1', 1") located radially on outside relative to a central axis (A);
electrically conductive wall elements (2, 2', 2") arranged substantially perpendicular to the central axis and connected to the electrically conductive casing element,
wherein at least one of the electrically conductive wall elements has a first opening (3), through which the central axis (A) extends wherein the electrically conductive casing element comprises at least a first (B1) and a second region (B2),
wherein the first region is located closer to the central axis than the second region, and
wherein a cross-section through the electrically conductive casing element has a shape of a polygon in a plane perpendicular to the central axis.

2. The chamber (12, 13) according to claim 1, wherein the electrically conductive casing element is conical at least in part.

3. The chamber (13) according to claim 1, wherein the first region of the electrically conductive casing element is located in a middle of the chamber relative to an axial direction of the central axis.

4. The chamber (11, 12, 13) according to claim 1, wherein the chamber comprises three mutually parallel wall elements, wherein all three mutually parallel wall elements have a central opening, through which the central axis extends.

5. The chamber (11, 12, 13) according to claim 1, wherein at least one of the electrically conductive wall elements has a second opening.

6. The chamber (11, 12, 13) according to claim 1, wherein said first opening (3) is surrounded by an inner rim of said at least one wall element, wherein said inner rim has at least a first section (S1) protruding towards said central axis (A) and a second section (S2) being more distant from said central axis than said first section.

7. A vacuum pressure sensor (40) comprising a chamber (11, 12, 13) according to claim 1 as a cathode, an anode (41)

arranged along the central axis of the chamber, and a permanent magnet (44) arranged radially outside the chamber for generating a magnetic field in an interior of the chamber.

8. The vacuum pressure sensor comprising a chamber (11, 12, 13) according to claim 1 as an anode or part of an anode, a cathode at least partly arranged along the central axis of the chamber, and a permanent magnet arranged radially outside the chamber for generating a magnetic field in an interior of the chamber.

9. The vacuum pressure sensor (40) according to claim 7, the vacuum pressure sensor further comprising a housing having a flange (45) surrounding an aperture for establishing fluid connection between the plasma generation area (42) inside the vacuum pressure sensor and a measuring space outside the vacuum pressure sensor, wherein a radiation-permeable element is arranged in a wall of said housing in such a way that electromagnetic radiation emitted from the plasma generation area can reach an outside of the housing through said radiation-permeable element, wherein said chamber is located inside said housing, wherein said first region (B1) is located on a first side of the chamber oriented towards said flange (45) and wherein said second region (B2) is located on a second side of the chamber oriented towards said radiation-permeable element (46), in particular, wherein the electrically conductive casing element of the chamber has a frusto-conical shape tapering towards said flange.

10. The vacuum pressure sensor (40) according to claim 9, wherein an optical element (53) and a spectrometer (54) are arranged on an outer side of said housing, wherein said radiation-permeable element (46) and said optical element (53) cooperate to collect and focus electromagnetic radiation emitted from a region (55) around the anode to an optically sensitive element of the spectrometer, in particular, wherein the optical element (53) is adaptable to compensate for an axial displacement of said radiation emitting region (55).

* * * * *